April 19, 1927.

C. H. HYATT

TRACTION DEVICE FOR MOTOR VEHICLES

Filed March 22, 1926

1,625,028

Inventor
CHARLES H. HYATT.
BY HIS ATTORNEYS
Williamson Reif & Williamson

Patented Apr. 19, 1927.

1,625,028

UNITED STATES PATENT OFFICE.

CHARLES H. HYATT, OF COTTAGEWOOD, MINNESOTA.

TRACTION DEVICE FOR MOTOR VEHICLES.

Application filed March 22, 1926. Serial No. 96,518.

This invention relates to motor vehicles and especially to traction devices for vehicle tires, adapted to dislodge the wheels supported in mud, snow or soft ground.

It is the main object of this invention to provide a small extremely simple traction device for vehicle tires capable of being carried in a vehicle or on the person of a driver and having a high degree of efficiency for furnishing a traction surface on which the vehicle may dislodge itself through its own power.

A further object is to provide such a device comprising a member having an irregular traction surface adapted to be wedged beneath a vehicle tire and the ground by the revolution of the vehicle wheel and of such construction that it may be supported by soft ground, snow or mud.

It is a more specific object in such a device to provide an elongated body member having an irregular, substantially cylindrical surface adapted to contact the tread of the tire and provided with ground engaging arms preventing the body member from further turning after the same is rolled between the tire and the ground through the revolution of the wheels.

A still further object of the invention is to provide an irregular cylindrical body member for the device preferably of coiled construction whereby the soft material on which the same is supported may be wedged between the several convolutions of the coil to more efficiently support the same.

An additional object is to provide an extremely light device of this class having means for attachment to the running board of an automobile whereby when the automobile is dislodged from mire or snow the device will be dragged therewith and it will not be necessary for the driver to return to pick up the traction device.

These and other objects of the invention will be apparent from the following description made in connection with the accompanying drawings, wherein like characters refer to similar parts throughout the several views, and in which—

Figure 1:
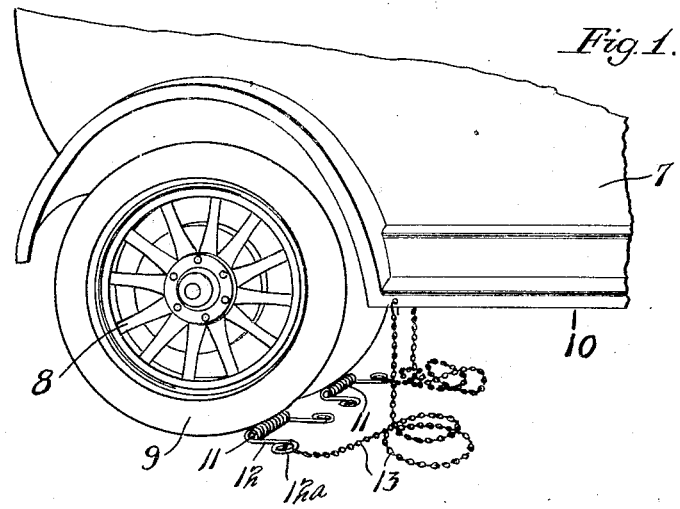
Fig. 1 is a side elevation of the rear portion of an automobile with the preferred form of my device in position to be utilized on the rear wheels.
Figure 2:
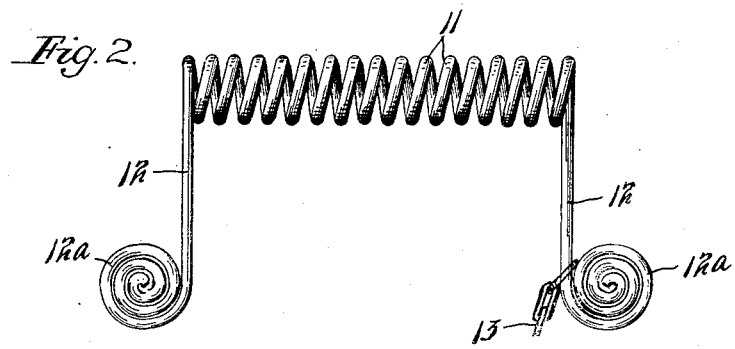
Fig. 2 is a plan view of my device detached.

In the drawings the rear portion of a standard motor vehicle is illustrated having the body 7, the rear wheels 8, the tires 9 and the running board 10.

My device comprises an irregular cylindrical body member 11 of preferably coil construction and of sufficient length to more than traverse the width of a large size vehicle tire. Body member 11 carries at each end an outwardly projecting arm 12 extending preferably at right angles to the longitudinal center of said body member. Arms 12 lie in a common plane and each terminates in a relatively wide, flat ground engaging portion 12$^a$. The ground engaging portions 12$^a$ may be formed in any desired manner but are preferably formed by coiling the outer extremities of arm 12 in a flat volute.

The entire device may be constructed from an elongated rod or thick wire, the central portion being coiled in the form of a spring and the end portions being bent at right angles to the axis of body portion 11 and extending in a common plane and the ground engaging portions 12$^a$ constructed in the manner described.

A chain or other flexible member 13 may be secured to one of the ground engaging portions 12$^a$ of the device at one end to the running board or other part of the motor vehicle at the other end. Flexible member 13 is of sufficient length to extend considerably beyond the rear of the vehicle tire from the point to which attached, whereby when the device is employed, the traction may be furnished and the car dislodged by its own power, thereafter disengaging the device. It therefore will not be necessary for the driver to return to the place where traction was applied to pick up the device.

*Operation.*

Figure 3:
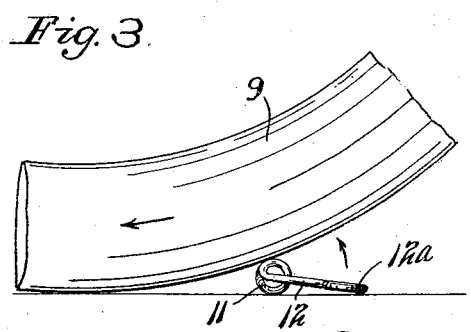
Figs. 3 and 4 are side and plan views respectively of my device in position to be utilized by a vehicle tire.
Figure 5:
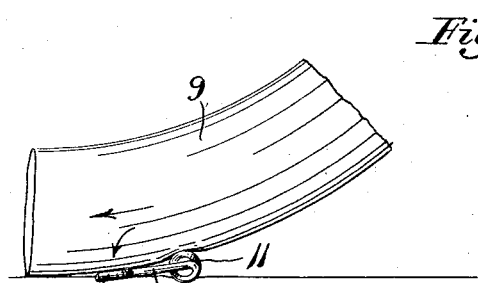
Figs. 5 and 6 are side and plan views of my device after power has been applied to a vehicle tire and the device has rolled or crept to its proper operative position.
Figure 4:
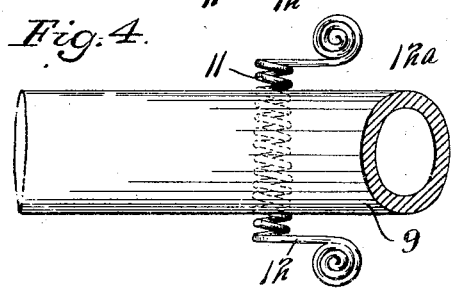
Figure 6:
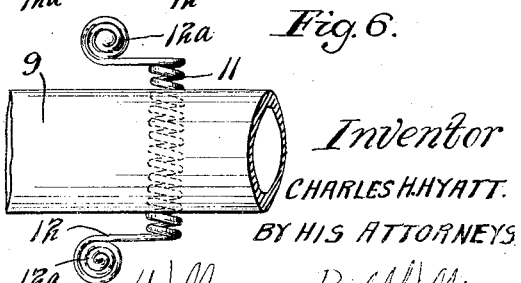

The operation of the above described device may be briefly summarized as follows:

When a vehicle is unable to get the necessary traction to dislodge itself from soft ground or snow through its own power, my device may be employed by inserting or wedging body member 11 between the forward side of the tire and the ground with the arms 12 extended forwardly, as shown in Figs. 1, 3 and 4. Power is then applied to the rear wheels and the revolution of the tire 9 will cause body member 11 to roll or turn inwardly and creep beneath the tread of the tire. The corrugated surface furnished by the coiled body member affords a good grip for the tire and the ground engaging portions 12$^a$ on the arms prevent body member 11 from further turning after the same has turned through approximately 180°. The soft ground material will wedge in between the several convolutions of the body member 11 and within the coil, thereby efficiently supporting the device and permitting the vehicle to speedily dislodge itself through its own power.

Extensive tests have been made with this device and it has been found highly efficient for the purposes enumerated.

As has been stated, when the automobile is dislodged it may drag the traction device with it, whereby the driver need not get out and return to the spot where the traction was employed to pick up the device.

It will of course be understood that the form, shape and construction of this device may be varied to a considerable extent without departing from the scope of the invention.

What is claimed is:

1. A traction device for motor vehicles comprising a revoluble member adapted to be disposed forward of the point of tangency of a vehicle wheel and the ground and transversely engaging the vehicle tire, whereby the revolution of the vehicle wheel will turn said member causing it to creep beneath the tire, and outwardly projecting means carried by said member for limiting the revolution thereof.

2. A traction device for motor vehicles comprising a substantially cylindrical member adapted to be disposed slightly forward of the point of tangency of a vehicle tire and the ground and transversely engaging the tread of said tire, whereby the revolution of the vehicle wheel will revolve said member causing it to creep beneath the tire, and outwardly extending means carried by said member adapted to engage the ground to limit the revolution of said member.

3. A traction device for motor vehicles comprising a helical body member adapted to be disposed slightly forward of the point of tangency of a vehicle tire and the ground, and transversely engaging said tire, whereby the revolution of the vehicle wheel will cause said body member to revolve and creep beneath said tire, and outwardly projecting means connected to said body member adapted to engage the ground to prevent further revolution of said member after the same has completed a partial revolution.

4. A traction device for motor vehicles comprising a member having an irregular substantially cylindrical outer surface adapted to be disposed slightly forward of the point of tangency between the vehicle tire and the ground, transversely engaging the tread of said tire whereby the forward revolution of the vehicle wheel will turn said member backwardly beneath the tire, and ground engaging means carried by said member adapted to prevent further turning thereof after said member has performed a partial revolution.

5. The structure set forth in claim 4 and said ground engaging means comprising a pair of outwardly extending arms lying substantially in a common plane.

6. A traction device for motor vehicles comprising a coiled body member adapted to be disposed slightly forward of the point of tangency of a vehicle tire and the ground, transversely engaging the tread of said tire whereby the revolution of the vehicle wheel will turn said member beneath the tire, and outwardly projecting arms at the end of said coiled member lying substantially in a common plane and terminating in relatively wide ground engaging portions adapted to prevent further turning of said member after the same has completed a partial revolution.

In testimony whereof I affix my signature.

CHARLES H. HYATT.